United States Patent
Anderson

(10) Patent No.: US 6,828,923 B2
(45) Date of Patent: Dec. 7, 2004

(54) AIRBORNE MICROWAVE/INFRARED WIND SHEAR AND CLEAR AIR TURBULENCE DETECTOR

(75) Inventor: Christopher M. Anderson, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 49 days.

(21) Appl. No.: 10/301,934

(22) Filed: Nov. 22, 2002

(65) Prior Publication Data

US 2004/0100395 A1 May 27, 2004

(51) Int. Cl.[7] ............................................. G08B 23/00
(52) U.S. Cl. ...................... 340/968; 340/962; 342/26 B
(58) Field of Search ................. 340/968, 962, 340/963; 342/26 B, 54

(56) References Cited

U.S. PATENT DOCUMENTS

| | | | | |
|---|---|---|---|---|
| 3,182,499 A | | 5/1965 | Moses | |
| 3,448,613 A | | 6/1969 | Kastner | |
| 4,195,931 A | * | 4/1980 | Hara | 356/454 |
| 4,319,332 A | * | 3/1982 | Mehnert | 342/27 |
| 4,965,573 A | * | 10/1990 | Gallagher et al. | 340/968 |
| 5,000,567 A | * | 3/1991 | Fleshner | 356/28.5 |
| 5,036,480 A | * | 7/1991 | Zweifel et al. | 703/8 |
| 5,523,759 A | * | 6/1996 | Gillberg et al. | 342/26 |
| 5,627,511 A | * | 5/1997 | Takagi et al. | 340/345 |
| 6,034,760 A | * | 3/2000 | Rees | 356/28.5 |
| 6,070,460 A | * | 6/2000 | Leslie et al. | 73/170.07 |
| 6,424,408 B1 | * | 7/2002 | Ooga | 356/28.5 |

\* cited by examiner

Primary Examiner—Toan N. Pham
(74) Attorney, Agent, or Firm—Kevin G. Mierzwa

(57) ABSTRACT

A system (24) for detecting an air disturbance in front of an aircraft (10) has a controller (26) that is coupled to an image detector (40). Image detector (40) generates an image signal corresponding to heated air in front of the aircraft (10). The air in front of the aircraft (10) is heated by direct high energy beams such as microwave beams (16, 18) from a respective microwave antenna (12, 14). By monitoring the image, the presence of an air disturbance may be determined. Position adjusters (30, 32) may be used to adjust the position of the beams (16, 18) by controlling the position of antennas (12, 14). The position of the beam is preferably maintained a predetermined distance (d) in front of the aircraft (10) so that an evasive maneuver may be performed.

20 Claims, 2 Drawing Sheets

AIRBORNE MICROWAVE/INFRARED WIND SHEAR AND CLEAR AIR TURBULENCE DETECTOR

TECHNICAL FIELD

The present invention relates generally to aircraft control systems, and more particularly, to an air disturbance detection system for an aircraft.

BACKGROUND ART

For smooth aircraft operation, a smooth flow of air over the aircraft wings is desired. Wind shear and clear air turbulence can lead to undesired motions in the aircraft. Wind shears are typically detected on the ground around airports. The information regarding wind shears is provided to pilots when approaching the airport. Turbulence is also an undesired effect on an aircraft. Turbulence may occur from following too closely to another aircraft. Such turbulence is typically avoided by spacing the aircraft take-offs and landings so that the turbulence has time to dissipate. However, other sources of turbulence, particularly when airborne, may be present in the aircraft's path. Also, wind shears may also be present in the aircraft path away from an airport or detection source Therefore, it would be desirable to provide a method for detecting the presence of air disturbances such as wind shears and clear air turbulence in front of an aircraft in time so that an evasive maneuver may be performed.

SUMMARY OF THE INVENTION

The present invention provides a system for detecting the presence of an air disturbance by imaging heated air in front of the aircraft.

In one aspect of the invention a method for monitoring an airborne disturbance in front of an airplane includes directing a high energy beam a distance in front of the airplane, heating the air with the beam, detecting an image of the heated air, and comparing the image to a profile to determine the presence of a disturbance.

In a further aspect of the invention, a system for detecting an air disturbance includes a high energy beam generator for generating a high energy beam in front of the aircraft. The system further includes an image detector for generating an image of the heated air in front of the aircraft. A controller is coupled to the image detector and compares the image to a profile to determine if the image resembles an air disturbance.

One advantage of the invention is that more stable operation of the aircraft may be obtained. Another advantage of the invention is that by directing the high energy beam far enough in front of the aircraft, evasive maneuvers may be performed prior to the air disturbance.

Other aspects and advantages of the present invention will become apparent upon the following detailed description and appended claims, and upon reference to the accompanying drawings.

BEST MODES FOR CARRYING OUT THE INVENTION

Figure 1:
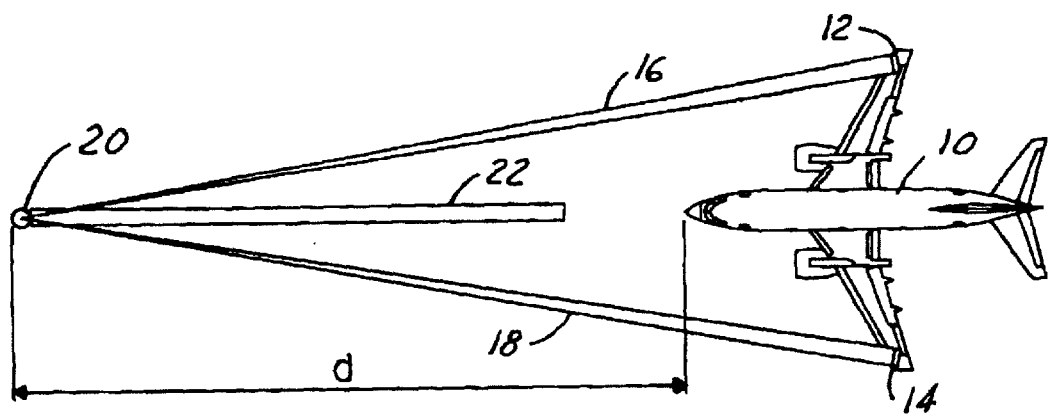
FIG. 1 is a top view representing two microwave beams positioned in front of an aircraft.

In the following figures the same reference numerals will be used to identify the same components. While a specific embodiment of the present invention is illustrated, various modifications within the spirit of the invention would be evident to those skilled in the art.

Referring now to FIG. 1, an aircraft 10 is illustrated having a first antenna 12 and a second antenna that each generate a respective beam 16, 18 to a point 20 in front of the aircraft. Although antenna are used other high energy beam generating sources may be used. Point 20 is spaced a predetermined distance d in front of the aircraft. As will be further described below, the distance d from aircraft 10 may vary based on the air speed of aircraft 10. Preferably, each beam 16, 18 are focused at or near the same point 20.

A region 22 in front of the aircraft having heated air is illustrated. The region closest to the aircraft and furthest away from point 20 is the coolest air and the region that is currently being heated at point 20 is correspondingly the hottest air. It should be noted that the heated air is actually the heated moisture within the air.

Figure 2:
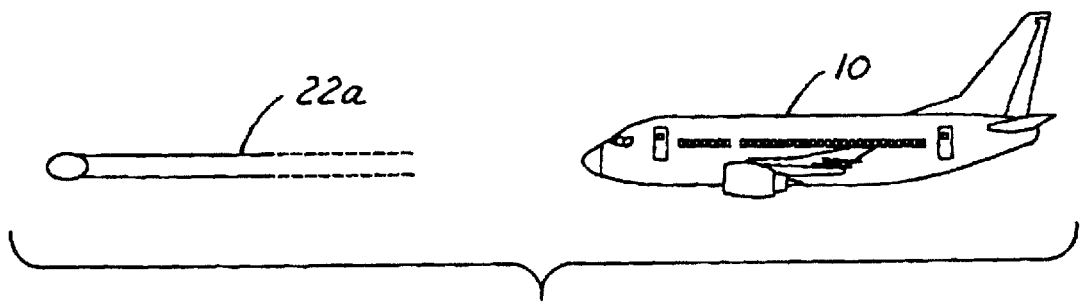
FIG. 2 illustrates an aircraft having a heated air area with no disturbance in front of the aircraft.

Referring now to FIG. 2, aircraft 10 is shown positioned in front of a region 22a that represents clear air. That is, region 22a has no air disturbance therein. The image of such an area from the plane's perspective is circular or nearly circular.

Figure 3:
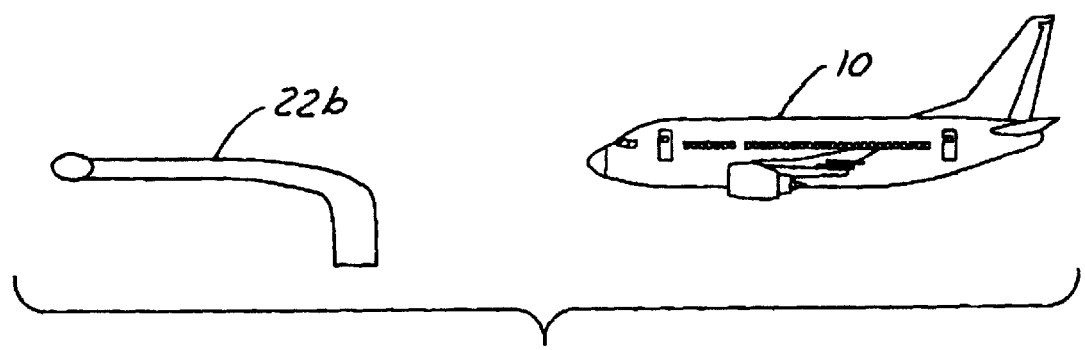
FIG. 3 illustrates a heated area in front of an aircraft representing a wind shear.

Referring now to FIG. 3, when a disturbance is present, the shape of the region 22 is changed. In this figure, region 22 has been changed to 22b and shows an indication of a wind shear. From the perspective of the aircraft, the wind shear takes on elliptical or a ribbon shape.

Figure 4:
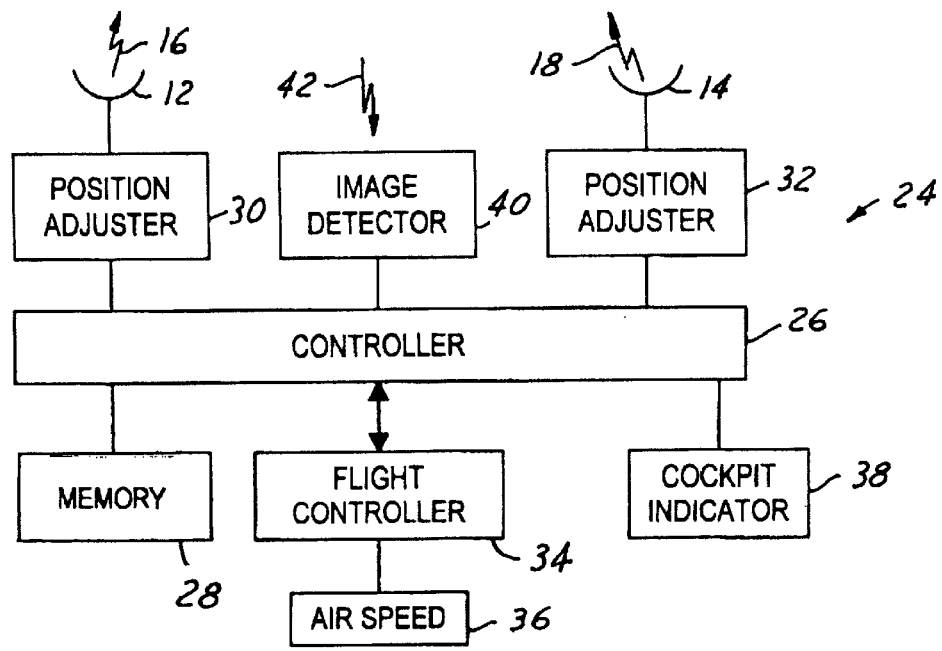
FIG. 4 is a block diagrammatic view of an air disturbance for an aircraft.

Referring now to FIG. 4, a system 24 for detecting an air disturbance in front of an aircraft is illustrated. The system includes a controller 26. Controller 26 is preferably microprocessor-based. Controller 26 may have memory 28 associated therewith. Memory 28, although illustrated as a separate component, may be incorporated as part of controller 26. Memory 28 may, for example, store images of air disturbances for comparison as will be further described below. Of course, the image may be processed digitally for comparison to a numerical threshold.

Controller 26 is coupled to a pair of position adjusters 30, 32 that are coupled to antennas 12 and 14, respectively. Position adjusters 30 and 32 may, for example, be motorized devices. Position adjusters 30, 32 adjust the position of beams 16, 18 as will be further described below. By adjusting the positions of antennas 12, 14, position adjusters 30, 32 are able to move the intersection point of the beams closer or further away from the aircraft.

Controller 26 may be coupled to a flight controller 34. Flight controller 34 is coupled to an air speed sensor 36. Air speed sensor or detector 36 provides information to the flight controller as to the air speed of the aircraft. Controller 26 receives this information from flight controller 34 and adjusts the position adjusters 30, 32 to adjust the position of high energy beam 16, 18. Flight controller 34 may also be used to control the aircraft to perform an avoidance maneuver so as to maneuver around any detected air disturbance. This will be further described below.

Controller 26 may also be coupled to a cockpit indicator 38. Cockpit indicator 38 may provide a visual or audible indication to the flight crew as to the presence of turbulence above. If automatic control is not seized, the flight crew may be instructed to maneuver around the sensed disturbance. Both automated control and an indicator may be provided.

Controller 26 is also coupled to an image detector 40. Image detector 40 in the present example is an infrared detector. The infrared image detector 40 is used to receive an image 42 of the air heated by the high energy beams in front of the aircraft. Image detector 40 may be located in various position on the aircraft including near the front of the fuselage.

Figure 5:
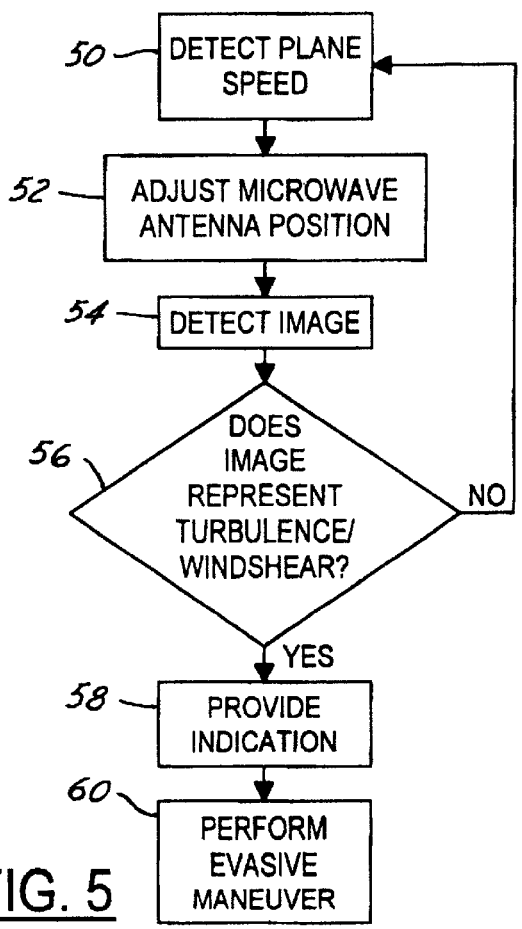
FIG. 5 is a flow chart of the operation of the system of FIG. 4.

Referring now to FIG. 5, a method for operating the system 24 of FIG. 4 is illustrated. In step 50 the aircraft speed is detected by a dedicated sensor or borrowing the data from another system. In step 52 the microwave antenna positions are adjusted by the position adjusters above. The position of the intersection of the two high energy beams or microwave beams is preferably spaced a distance so that an evasive maneuver may be performed. In step 54 an image is detected by the image detector 40. The image detector 40 generates an image signal that is compared to clear air versus other disturbances such as turbulence and wind shear. The comparison may be a profile of the actual images or numerical profile. In step 56, if the image does not represent an air disturbance, the system repeats in step 50. In step 56, if the image of the heated air represents an air disturbance, step 58 generates an indication to the flight crew as to the presence of a disturbance. In step 60 an evasive maneuver may be performed. The performance of the evasive maneuver in step 60 may be performed manually or may be performed automatically by an automated flight controller.

As can be seen above, various types of energy sources may be provided. However, a microwave source is the most suitable for the present application. By providing adjustments for the high energy beam, an evasive maneuver may be easily performed at a comfortable speed and pitch to maintain the ride quality for the passengers and crew.

While the invention has been described in connection with one or more embodiments, it should be understood that the invention is not limited to those embodiments. On the contrary, the invention is intended to cover all alternatives, modifications, and equivalents, as may be included within the spirit and scope of the appended claims.

What is claimed is:

1. A method for monitoring an airborne disturbance in front of an airplane comprising:
   directing a high energy beam a distance in front of the airplane;
   heating the air with the beam;
   detecting an image of heated air; and
   comparing the image to a profile to determine the presence of a disturbance.

2. A method as recited in claim 1 wherein directing comprises directing a first beam and a second beam in front of the aircraft.

3. A method as recited in claim 1 wherein comprises directing a first beam and a second beam in front of the aircraft comprises focusing the first beam and second beam to substantially a point.

4. A method as recited in claim 1 wherein directing comprises directing the high energy beam a distance as a function of air speed of the aircraft.

5. A method as recited in claim 1 wherein directing comprises changing the distance of the beam as a function of air speed of the aircraft.

6. A method as recited in claim 1 wherein directing comprises directing a microwave beam.

7. A method as recited in claim 1 wherein detecting comprises infrared detecting.

8. A method as recited in claim 1 wherein comparing comprises comparing the image to a profile to determine the presence of turbulence.

9. A method as recited in claim 1 wherein comparing comprises comparing the image to a profile to determine the presence of a wind shear.

10. A system for detecting an air disturbance in front of an aircraft comprising:
    a high energy beam generator generating a high energy beam;
    an image detector generating an image signal of heated air in front of the aircraft; and
    a controller coupled to said image detector, said controller comparing the image to a profile to determine a disturbance.

11. A system as recited in claim 10 wherein said image detector comprises an infrared detector.

12. A system as recited in claim 10 further comparing an indicator, said controller controlling the indicator in response to the disturbance.

13. A system for detecting an air disturbance comprising:
    an air speed detector generating an air speed signal;
    a first high energy beam generator generating a first high energy beam;
    a first position adjuster coupled to first high energy beam generator;
    a second energy beam generator generating a second energy beam;
    a second position adjuster coupled to second high energy beam generator;
    an image detector generating an image signal of heated air in front of the aircraft; an indicator; and
    a controller coupled to said air speed detector, said first position adjuster, said second position adjuster and said image detector, said controller controlling the position of the first beam and the second beam to a location a distance in front of the plane as a function of the air speed signal, said controller receiving image signal and controlling the indicator when the image signal corresponds to a disturbance.

14. A system as recited in claim 13 wherein said indicator comprises an avoidance maneuver control.

15. A system as recited in claim 13 wherein said indicator comprises a visual indicator.

16. A system as recited in claim 13 wherein said indicator comprises an audible indicator.

17. A system as recited in claim 13 wherein the distance corresponds to an avoidance maneuver distance.

18. A system as recited in claim 13 wherein said image detector comprises an infrared detector.

19. A system as recited in claim 13 wherein said air speed detector is a sensor.

20. A system as recited in claim 13 wherein said air speed signal is derived from an aircraft system.

* * * * *

UNITED STATES PATENT AND TRADEMARK OFFICE
CERTIFICATE OF CORRECTION

PATENT NO. : 6,828,923 B2
DATED : December 7, 2004
INVENTOR(S) : Christopher M. Anderson It is certified that error appears in the above-identified patent and that said Letters Patent is hereby corrected as shown below:

<u>Column 4,</u>
Line 26, should read as follows, -- 12. A system as recited in claim 10 further comprising an --

Signed and Sealed this

Twenty-second Day of March, 2005

JON W. DUDAS
*Director of the United States Patent and Trademark Office*